(12) United States Patent
Verby et al.

(10) Patent No.: US 8,887,965 B2
(45) Date of Patent: Nov. 18, 2014

(54) FILL PORT ASSEMBLY FOR COUPLING TOOLS TO A FEED PUMP

(75) Inventors: Matthew Verby, Maple Grove, MN (US); Robert J. Gundersen, Otsego, MN (US); Christopher A. Lins, Crystal, MN (US); Bret A. Deneson, Otsego, MN (US); Jeromy D. Horning, Albertville, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 0 days.

(21) Appl. No.: 13/817,098

(22) PCT Filed: Sep. 30, 2011

(86) PCT No.: PCT/US2011/001688
§ 371 (c)(1),
(2), (4) Date: Feb. 14, 2013

(87) PCT Pub. No.: WO2012/047278
PCT Pub. Date: Apr. 12, 2012

(65) Prior Publication Data
US 2013/0161357 A1    Jun. 27, 2013

Related U.S. Application Data

(60) Provisional application No. 61/388,451, filed on Sep. 30, 2010.

(51) Int. Cl.
*B65D 88/54*    (2006.01)
*F16L 37/00*    (2006.01)
*F04B 17/06*    (2006.01)
*F04B 53/16*    (2006.01)

(52) U.S. Cl.
CPC ............... *F16L 37/00* (2013.01); *F04B 17/06* (2013.01); *F04B 53/16* (2013.01)
USPC ........... 222/251; 222/333; 222/527; 222/567; 222/608; 417/360

(58) Field of Classification Search
USPC ......... 222/251, 567, 538, 539, 608, 609, 610, 222/394, 333, 385; 137/315.01; 239/154, 239/333; 156/578, 579; 417/360, 363
See application file for complete search history.

(56) References Cited

U.S. PATENT DOCUMENTS 5,529,462 A * 6/1996 Hawes ........................ 417/360
5,878,925 A * 3/1999 Denkins et al. ............... 222/608

(Continued)

OTHER PUBLICATIONS

International Search Report and Written Opinion for PCT Application Serial No. PCT/US2011/001688, dated May 1, 2012, 9 pages.

*Primary Examiner* — Frederick C Nicolas
*Assistant Examiner* — Bob Zadeh
(74) *Attorney, Agent, or Firm* — Kinney & Lange, P.A.

(57) ABSTRACT

A drywall feed pump system supplies drywall joint compound to a fill port assembly that allows for the connection of tools with various couplings, such as continuous flow pump tools and conventional automated hand tools. The assembly includes a feed hose, a mounting plate, a coupling plate, and a quick-connect adapter. An inlet of the feed hose connects to the feed pump system to supply the assembly with joint compound. The mounting plate provides a location for the outlet of the feed hose and accessory couplings to attach. The coupling plate facilitates the attachment to the drywall feed pump system. The quick-connect adapter extends from the mounting plate and facilitates the connection of various accessory couplings.

18 Claims, 5 Drawing Sheets

(56) References Cited

U.S. PATENT DOCUMENTS

| | | | |
|---|---|---|---|
| 6,382,922 B1 * | 5/2002 | Lewis et al. | 417/38 |
| 6,484,782 B1 * | 11/2002 | Lewis et al. | 156/578 |
| 7,036,291 B1 * | 5/2006 | Stark et al. | 53/454 |
| 8,105,058 B2 * | 1/2012 | Schlecht | 417/550 |
| 2003/0051753 A1 | 3/2003 | Stevens | |
| 2003/0208187 A1 * | 11/2003 | Layer | 606/1 |
| 2007/0122301 A1 * | 5/2007 | Schlecht | 417/437 |
| 2008/0257987 A1 | 10/2008 | Zagorsky | |

* cited by examiner

FILL PORT ASSEMBLY FOR COUPLING TOOLS TO A FEED PUMP

BACKGROUND

The present invention is directed to a tool fill port for use with drywall pumps. Specifically, the invention relates to a fill port assembly that can be added to a continuous flow drywall pump to permit filling of drywall joint compound applicator tools having various couplings.

Historically, drywall joint compound has been applied manually using hand tools, such as trowels. More recently, automated hand tools have been developed to apply drywall joint compound from dispensing tools having internal storage containers that can be filled with a fixed volume of joint compound. Such automated hand tools greatly increase efficiency by reducing time needed to apply the joint compound. The internal storage container is filled using a manually operated pump that is inserted into a joint compound bulk container, such as a bucket. After the internal storage container is emptied, the manually operated pump must again be employed to fill the automated hand tool. Each tool couples to the pump outlet using a coupling specifically configured for each tool that that is desired to be coupled to the pump outlet. As is known in the art, various tools exist, such as tapers and finishing tools, to apply joint compound to various drywall locations. Tapers typically require a cam lever coupling having a ball valve for joining a gooseneck to join to the pump outlet, such as shown in U.S. Pat. No. 5,878,925 to Denkins et al. Finishing tools, such as corner boxes and flat boxes, typically have a box that must be filled using a flat nozzle, or duck bill, coupled to the pump outlet, such as shown in U.S. Pat. No. 3,785,535 to Ames.

Recently, pump systems configured to provide a continuous flow of joint compound to a tool tethered to the pump through a hose have been developed in order to further save time related to refilling internal storage containers. Due to the expense of the continuous flow pump system and for the sake of convenience, tools configured for use with these systems typically all have the same coupling for joining with the pump outlet. Thus, continuous flow pump systems are often not compatible with conventional automated hand tools having internal storage containers.

SUMMARY

The present invention is directed to a fill port assembly for coupling accessories to a feed pump system. The fill port assembly comprises a feed hose, a mounting plate and a quick-connect adapter. The feed hose has an inlet end for connecting to a feed pump manifold, and an outlet end. The mounting plate comprises a linkage coupled to the mounting plate for joining the fill port assembly to a feed pump system, and a discharge orifice extending through the mounting plate for receiving the outlet end. The quick-connect adapter extends from the mounting plate for joining tool couplings to the mounting plate adjacent the discharge orifice.

DETAILED DESCRIPTION

Figure 1:
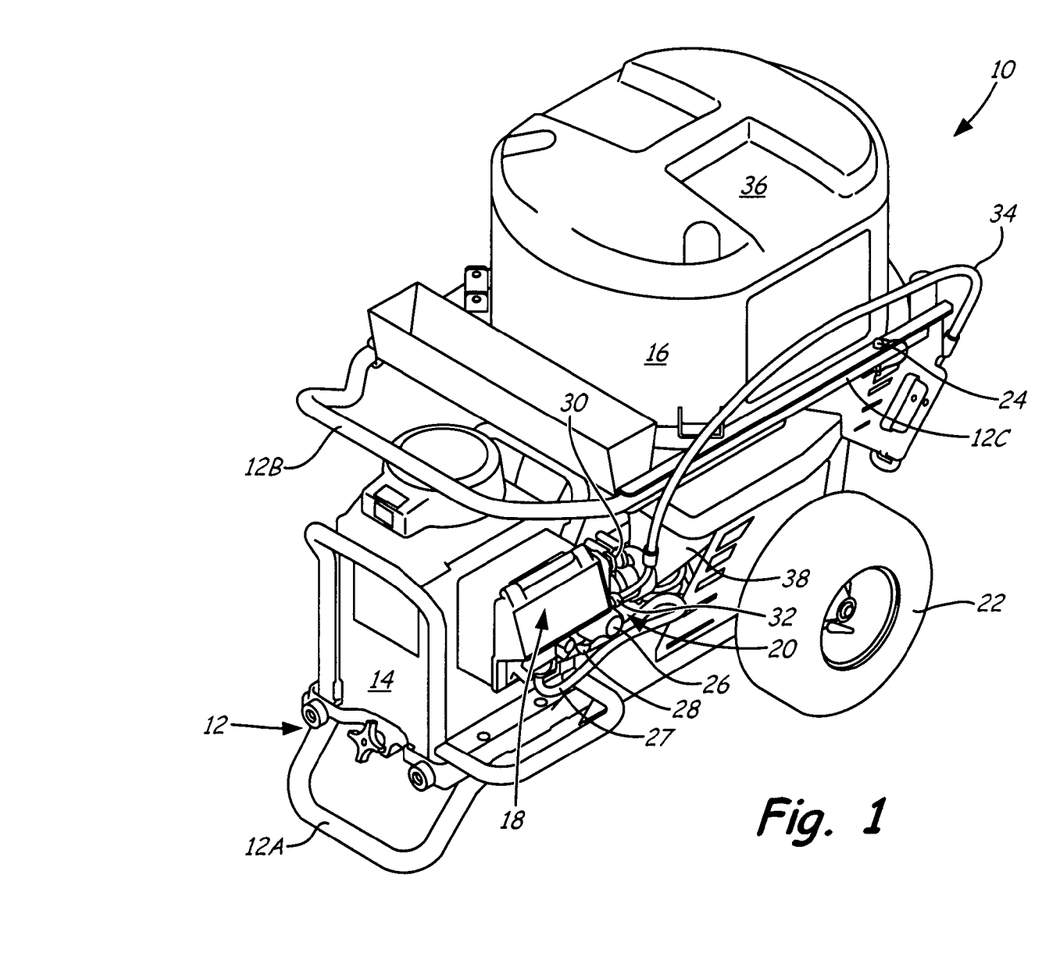
FIG. 1 is a perspective view of a continuous flow pump system for use with tools for applying drywall joint compound.

FIG. 1 is a perspective view of continuous flow pump system 10 for use with tools for applying drywall joint compound. Pump system 10 comprises cart 12, pump module 14, hopper 16, control panel 18 and manifold 20. Cart 12 provides a framework upon which components of system 10 can be mounted for convenience and mobility. Cart 12 includes platform bar 12A, handle bar 12B, frame 12C, wheels 22 and pin 24. Manifold 20 includes control knob 26, power cord 27, feed hose 28, continuous flow outlet 30, controlled flow outlet 32 and recirculation hose 34. Hopper 16 includes cover 36 and discharge neck 38.

Pump module 14 and hopper 16 are mounted to platform bar 12A. Handle bar 12B is coupled to platform bar 12A via frame 12C and wraps around pump module 14 and hopper 16. Handle bar 12B is inserted into frame 12C and retained within frame 12C via pin 24. Wheels 22 (only one of which is shown in FIG. 1) are mounted to platform bar 12A so that system 10 can be wheeled around to different locations. An operator of system 10 can push, pull or otherwise move system 10 using handle bar 12B.

Control panel 18 is mounted to pump module 14 and is electronically and fluidly coupled to manifold 20 and pump module 14 through appropriate connections. Power cord 27 can be plugged into an electrical power outlet to provide power to pump module 14 and control panel 18. Pump module 14 includes a motor that drives a pump coupled to hopper 16 and manifold 20. The pump includes an inlet coupled to hopper neck 38 and an outlet coupled to an inlet of hose 28. Hose 28 feeds into manifold 20. Discharge neck 38 of hopper 16 funnels joint compound to the pump within pump module 14. Hopper 16 includes an access opening, which is closed by cover 36. An operator of system 10 removes cover 36 to fill hopper 16 with drywall joint compound in preparation for use.

After adjusting the settings of system 10, such as pump speed, system pressure, fill capacity, etc., at control panel 18, the output of the pump is set using control knob 26 of manifold 20. Manifold 20 includes settings for priming the pump using controlled flow outlet 30 and hose 34, opening the pump to ambient pressure, and discharging joint compound at continuous flow outlet 34 on manifold 30. To prime the pump, hose 34 is inserted into hopper 16 (with cover 26 removed) and control knob 26 of manifold 20 is positioned to discharge joint compound from outlet 32. Thus, joint compound can be circulated from pump module 14 back to hopper 16 until the pump is fully pressurized and primed. To dispense joint compound, a tool is coupled to outlet 30 and control knob 26 is positioned to discharge joint compound at outlet 30. After operation of system 10 is completed and joint compound is purged from system 10, control knob 26 is rotated to open the pump to ambient pressure so that appropriate cleaning measures can be taken.

Outlet 30 is designed to receive accessories, such as tools, hoses, boxes, finishers, tapers, etc., having the same coupling. These accessories are configured to receive and use the continuous flow of joint compound provided by pump module 14 at outlet 30. Outlet 30 is thereby dedicated for use by continuous flow tools. In the configuration shown, outlet 32 is dedicated for recirculation hose 34. However, not all drywall tools are compatible with the fitting of outlet 30. In particular, tools not configured to receive a continuous flow of joint compound, i.e. tools having an internal storage container, are often provided with unique couplings configured for joining to dedicated hand pumps. The present invention is directed to a fill port assembly that can be linked to manifold 20 to allow simultaneous joining of continuous flow tools and non-continuous flow tools to system 10. In particular, continuous flow tools are coupled to outlet 30, and a fill port assembly is coupled to outlet 32 for non-continuous flow tools. The fill port assembly includes a discharge orifice having a quick-connect adapter that permits different couplings to be joined to outlet 32, including a coupling for connecting tube 34 for recirculation and priming operations.

Figure 2:
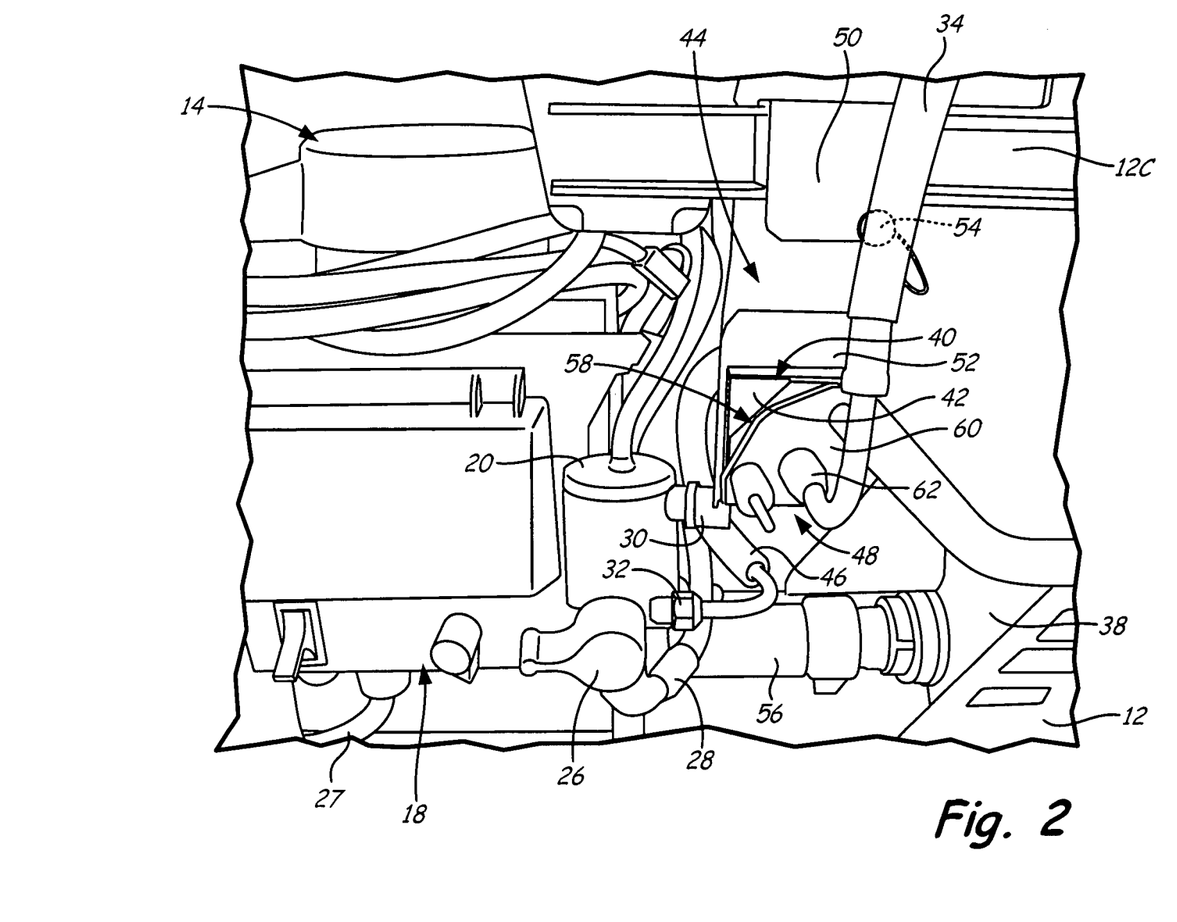
FIG. 2 is a close-up perspective view of a manifold for the continuous flow pump system of FIG. 1 showing a controlled flow outlet coupled to a fill port assembly of the present invention and a continuous flow outlet.

FIG. 2 is a close-up perspective view of manifold 20 for continuous flow pump system 10 of FIG. 1 showing continuous flow outlet 30 and controlled flow outlet 32 of manifold 20. Controlled flow outlet 32 is coupled to fill port assembly 40, which is attached to a recirculation hose 34. Fill port assembly 40 includes mounting plate 42, coupling plate 44, extension hose 46 and quick-connect adapter 48. Coupling plate 44 includes folded hook portion 50, flat mounting portion 52 and pin 54. Pump module 14 includes pump 56. Recirculation coupling 58, which includes bulkhead 60 and fitting 62, is coupled to fill port assembly 40.

Pump module 14, hopper 16, control panel 18 and manifold 20 are mounted to cart 12. Drywall joint compound is fed to an inlet of pump 56 by discharge neck 38 of hopper 16. Feed hose 28 supplies joint compound from an outlet of pump 56 to manifold 20. Depending on the position of control knob 26, manifold 20 supplies joint compound to outlet 30 or outlet 32. Controlled flow outlet 32 comprises a fitting that is configured to receive a coupling joined to hose 46 of fill port assembly 40 when control knob is rotated to the left-hand position, as shown. Continuous flow outlet 30 comprises a fitting that is configured to receive couplings of various tools designed to receive a continuous flow of joint compound when control knob 26 is rotated to a right-hand position. Manifold 20 and pump 56 are opened to ambient pressure when knob is rotated to a downward position.

Continuous flow outlet 30 provides a dedicated outlet for providing joint compound to continuous flow tools. For example, tools distributed by Ames Taping Tools Systems, Inc., Duluth, Ga. are configured to be coupled to outlet 30 in one embodiment of the invention. In another embodiment, outlet 30 comprises a poppet valve having a threaded collar for receiving a mating threaded hose adapter. Controlled flow outlet 32 provides an outlet that can be directly coupled to recirculation hose 34 as shown in FIG. 1, or that can be coupled to fill port assembly 40 as shown in FIG. 2. In one embodiment, outlet 32 comprises a threaded tube onto which mating collars can be threaded. Quick-connect adapter 48 of fill port assembly 40 allows various self-contained tools, such as the taper described in U.S. Pat. No. 4,086,121 to Ames, to be coupled to pump 56. Additionally, quick-connect adapter 48 can be used to join other accessories, such recirculation hose 34 through recirculation coupling 58.

Fill port assembly 40 is connected to cart 12 of system 10 by suspending coupling plate 44 from frame 12C via folded hook portion 50. As such, mounting plate 42 is in position to be joined to controlled flow outlet 32 via hose 46. Mounting plate 42 is joined to flat mounting portion 52 of coupling plate 44 via assembly of quick-connect adapter 48. Quick-connect adapter 48 also joins bulkhead 60 to mounting plate 42. Bulkhead 60 includes fitting 62, which is designed to link with hose 34. Fitting 62 functions equivalently as the fitting comprising outlet 32. Quick-connect adapter 48 is configured to provide an anchor point or junction for joining different types of tool couplings to outlet 32. Thus, bulkheads having different hardware, such as valve mechanisms or fill nozzles, can be joined to mounting plate 42.

Figure 3:
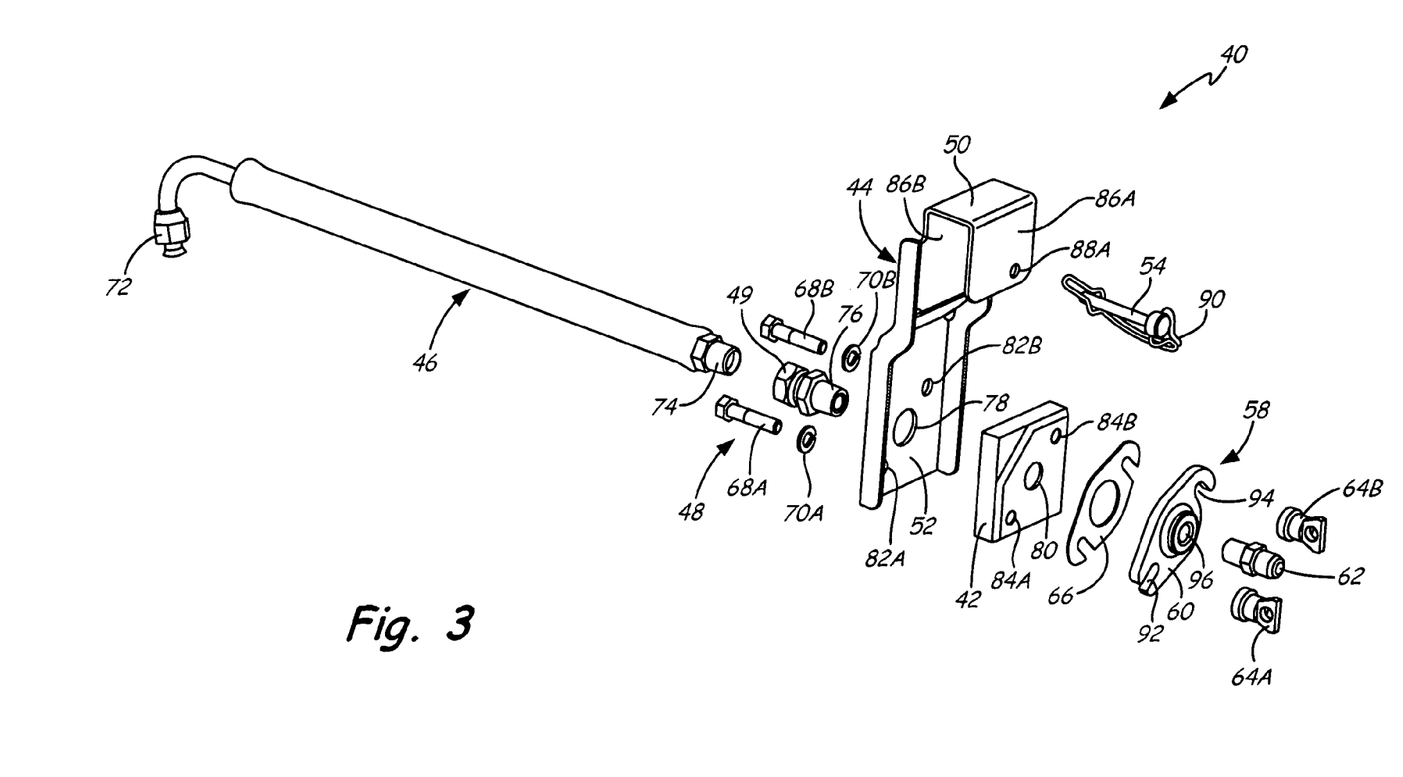
FIG. 3 is an exploded view of the fill port assembly of FIG. 2 showing a feed hose, a mounting plate and a quick connect adapter.

FIG. 3 is an exploded view of fill port assembly 40 of FIG. 2 showing mounting plate 42, coupling plate 44, feed hose 46, quick connect adapter 48 and discharge fitting 49. Also shown in FIG. 3 is recirculation coupling 58, which includes bulkhead 60, fitting 62 and nuts 64A and 64B. Seal 66 is shown being positioned between bulkhead 60 and mounting plate 42. Quick-connect adapter 48 includes studs 68A and 68B, and washers 70A and 70B. Hose 46 comprises a flexible tubing and includes fitting 72 and threaded tube 74.

Fitting 72 of hose 46 is configured to join with controlled flow outlet 32 of manifold 20, and threaded tube 74 is configured to mate with fitting 49. Fitting 49 also includes discharge orifice 76, which is inserted through discharge hole 78 in flat mounting portion 52 and into discharge bore 80 in mounting plate 42. Studs 68A and 68B are inserted through washers 70A and 70B and mounting holes 82A and 82B, respectively, of flat mounting portion 52. Studs 68A and 68B are also coupled to mounting bores 84A and 84B, respectively, of mounting plate 42. In one embodiment, studs 68A and 68B comprise threaded fasteners that are threaded into mating threads within bores 84A and 84B. As such, mounting plate 42 can be brought into engagement with coupling plate 44. In another embodiment, studs 68A and 68B are secured to coupling plate 44 via threaded engagement with nuts 64A and 64B. Mounting plate 42 comprises a rectilinear body having flat surfaces for adjoining flat mounting portion 52 and bulkheads of adjacent couplers, and is of sufficient thickness to permit joining of fitting 49 and studs 68A and 68B.

Flat coupling portion 52 is linked to cart 12 of system 10 via folded hook portion 50. Folded hook portion 52 comprises a linkage that permits fill port assembly 40 to be joined to system 10. Folded hook portion 50 includes forward and aft panels 86A and 86B that align with frame 12C (FIG. 2). Panel 86A includes pin hole 88A and panel 86B includes another pin hole (not seen in FIG. 3) aligned with pin hole 88A. Self-retaining pin 54 is inserted through pin hole 88A and the pin hole in panel 86B so as to extend beneath frame 12C, thereby securing fill port assembly 40 to cart 12. Self-retaining pin 54 includes deformable clip 90 that is pivotally connected to one end of pin 54 and includes a loop to fit over a second end of pin 54 to prevent pin 54 from being removed from coupling plate 44. In other embodiments, other types of self-retaining pins may be used, such as cotter pins.

Discharge orifice 76 of fitting 49 aligns generally flush with discharge bore 80, while studs 68A and 68B extend beyond holes 84A and 84B to permit joining of bulkhead 60 and nuts 64A and 64B. Assembled as such, studs 68A and 68B form a quick-connect coupling that permit different types of coupling devices to be joined to fill port assembly 40. In the illustrated embodiment, bulkhead 60 for recirculation hose 46 (FIG. 2) comprises the accessory attached to mounting plate 42 to receive output from discharge orifice 76. Bulkhead 60 comprises a slot and hook coupler that easily and quickly joins with studs 68A and 68B. In particular, slot 92 slips onto stud 68A and bulkhead 60 is rotated about stud 68A until hook 94 slides over stud 68B. Seal 66 comprises felt, cardboard, or some other sealing material that prevents leaking of joint compound between bulkhead 60 and mounting plate 42. Seal 66 approximates the profile of bulkhead 60 and includes openings for matching with bores 80, 84A and 84B. Nuts 64A and 64B include flanges to provide gripping points for easily rotating nuts 64A and 64B on studs 68A and 68B. Nuts 64A and 64B are threaded onto studs 68A and 68B, respectively, to bring bulkhead 60 into fixed engagement with mounting plate 42. In such a position, opening 96 of bulkhead 60 aligns with discharge bore 80 in mounting plate 42. Opening 96 receives fitting 62, which allows recirculation hose 46 to be joined to bulkhead 60. Specifically, fitting 62 includes a first end configured to be inserted securely into opening 96, and a second end over which hose 46 is securely fitted. The second end of fitting 62 provides an equivalent fitting as outlet 32, over which hose 46 can be slid or otherwise joined. Studs 68A and 68B, however, permit other types of couplings to quickly and easily join to fill port assembly 40.

Figure 4:
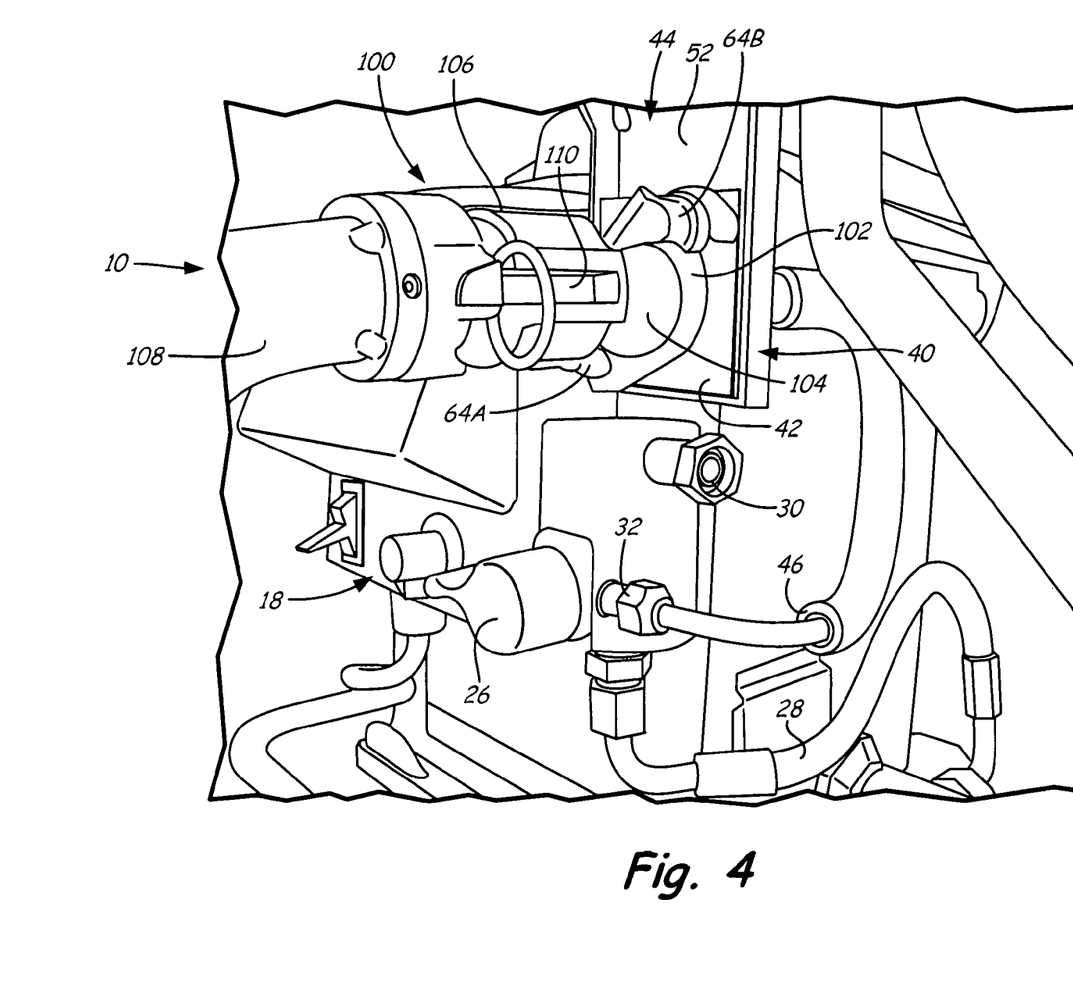
FIG. 4 is a close-up perspective view of the fill port assembly of FIG. 2 attached to a cam lever coupling for a drywall joint compound applicator tool.

FIG. 4 is a close-up perspective view of fill port assembly 40 of FIG. 2 attached to cam lever coupling 100 for a drywall joint compound application tool (not shown). FIG. 4 shows continuous flow pump system 10 including the same elements as shown in FIG. 2, with recirculation coupling 58 being replaced by cam lever coupling 100. Cam lever coupling 100 includes bulkhead 102, tube 104, sleeve 106, gooseneck 108 and lever 110. Cam lever coupling 100 is typically used to join taping tools to fill port assembly 40. Cam lever coupling 100, including bulkhead 102, is an alternative coupling to that of recirculation coupling 58, including bulkhead 60. Bulkhead 102 and bulkhead 60 are each configured to allow different accessories to be attached to discharge orifice 80. Each is configured to join to studs 68A and 68B of quick-connect adapter 48.

Mounting plate 42 is secured to pump system 10 through coupling plate 44 as previously described. Mounting plate 42 includes studs 68A and 68B (FIG. 3) onto which nuts 64A and 64B are threaded to join bulkhead 102 with fill port assembly 40. Bulkhead 102 comprises a slot and hook coupler comparable to bulkhead 60. However, bulkhead 60 includes tube 104 that surrounds an opening similar to opening 96 in bulkhead 60. Sleeve 106 attaches to tube 104 to join gooseneck 108 to system 10. As is known in the art, a valve assembly is positioned between sleeve 106 and tube 104 that is actuated as levers 110 push tube 104 into sleeve 106.

Cam lever coupling 100 of the present invention includes bulkhead 102 that allows tube 104 to be joined to quick-connect adapter 48 of fill port assembly 40. Bulkhead 102 aligns tube 104 with discharge bore 80 (FIG. 3) of mounting plate 42 so joint compound from hose 46 is directed into gooseneck 108. Gooseneck 108 comprises an attachment tube used to fill taping tools, as is known in the art. Bulkhead 102 is secured in the same manner as bulkhead 60 of FIGS. 2 and 3. Other types of bulkheads can be coupled to fill port assembly 40 using quick-connect adapter 48.

Figure 5:
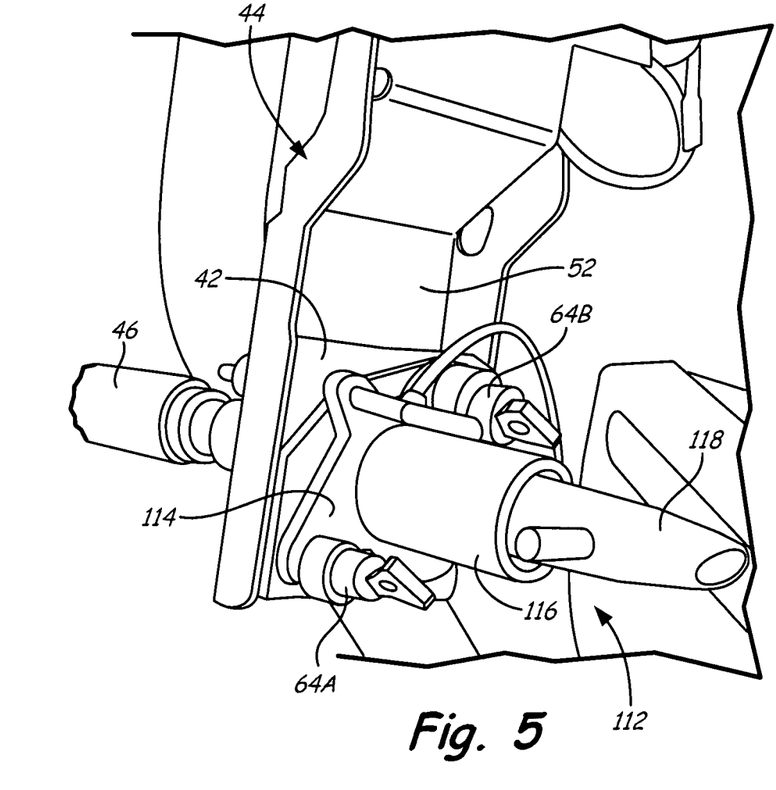
FIG. 5 is a close-up perspective view of the fill port assembly of FIG. 2 attached to a fill nozzle coupling for a drywall joint compound applicator tool.

FIG. 5 is a close-up perspective view of fill port assembly 40 of FIG. 2 attached to fill nozzle coupling 112 for a drywall joint compound application tool (not shown). Fill nozzle coupling 112 includes bulkhead 114, tube 116 and duck bill 118. Mounting plate 42 is secured to pump system 10 through coupling plate 44 as previously described. Bulkhead 114 of the present invention comprises a plate having two holes for receiving studs 68A and 68B of quick-connect adapter 48 (FIG. 3). As such, bulkhead 114 is slid axially over studs 68A and 68B. Nuts 64A and 64B secure bulkhead 114 to mounting plate 42. Bulkhead 114 is attached to tube 116 that receives conventional duck bill 118. Duck bill 118 is inserted into a box of a finishing tool, such as a corner box or flat box as are known in the art, so that pump system 10 can be operated to fill the box with joint compound ahead of use.

Fill nozzle coupling 112 and bulkhead 114, are alternatives to 1) recirculation coupling 58 and bulkhead 60, and 2) cam lever coupling 100 and bulkhead 102. Bulkhead 114, bulkhead 102 and bulkhead 60 are each configured to allow different accessories to be attached to discharge orifice 80. Each is configured to join to studs 68A and 68B of quick-connect adapter 48.

The present invention provides a fill port assembly that enables couplers having different accessories, such as tools, recirculation hoses, duck bills, goosenecks, etc., to be joined to a manifold outlet of a continuous flow pump. In particular, the fill port assembly includes a quick-connect adapter that permits bulkheads of different accessories to be joined to a mounting plate having an orifice for discharging a fluid, such as drywall joint compound. In the disclosed embodiment, the quick-connect adapter comprises a pair of studs to which a bulkhead having a pair of holes or a slot and hook configuration can be coupled. The fill port assembly includes a mounting plate having a discharge orifice that receives fluid from the manifold of the pump. The discharge orifice may include a fitting that enables a hose to be more readily coupled to the mounting plate. The mounting plate also includes a linkage, such as a hook, that allows the fill port assembly to be removably attached to the continuous flow pump. In one embodiment, the linkage comprises an additional plate coupled to the mounting plate having a hole that aligns with the discharge orifice. In other embodiments, the linkage can be integral to the mounting plate. The fill port assembly of the present invention can be retrofitted to manifolds of existing continuous flow pump systems or can be included in new continuous flow pump systems. As such, fill port assemblies, such as those depicted in FIG. 3, can be sold as kits separate from the continuous flow pump system.

Although the present invention has been described with reference to preferred embodiments, workers skilled in the art will recognize that changes may be made in form and detail without departing from the spirit and scope of the invention.

The invention claimed is:

1. A fill port assembly for coupling accessories to a feed pump system, the fill port assembly comprising:
    a feed hose having:
        an inlet end for connecting to a feed pump manifold; and
        an outlet end;
    a mounting plate including a discharge orifice extending through the mounting plate for connection to the outlet end of the feed hose;
    a coupling plate comprising:
        a folded hook portion that attaches to the pump system;
        a flat mounting portion that attaches to the mounting plate; and
        a discharge hole extending through the flat mounting portion of the coupling plate for alignment with the discharge orifice of the mounting plate; and
    a quick-connect adapter extending from the mounting plate for joining accessory couplings to the mounting plate adjacent the discharge orifice.

2. The fill port assembly of claim 1 wherein the quick-connect adapter comprises:
    a pair of mounting lugs extending from the mounting plate.

3. The fill port assembly of claim 2 wherein:
    the folded hook portion for suspending the mounting plate from a feed pump system; and
    the discharge hole extends through the flat mounting portion to receive the outlet end of the feed hose.

4. The fill port assembly of claim 3 wherein the mounting plate further includes:

a rectilinear body with the discharge orifice extending therethrough; and a pair of threaded lug bores extending through the rectilinear body to receive the pair of mounting lugs, the pair of mounting lugs being threaded to engage the threaded lug bores.

5. The fill port assembly of claim 3 and further comprising:

a pair of lug bores extending through the mounting plate; and a pair of lug holes extending through the flat mounting portion of the coupling plate;

wherein the pair of mounting lugs are inserted into the pair of lug holes and the pair of lug bores.

6. The fill port assembly of claim 5 and further comprising:

a slot and hook bulkhead for coupling to the pair of mounting lugs, the slot and hook coupler including an opening for receiving an accessory; and a pair of nuts engaging the pair of mounting lugs to bring the slot and hook bulkhead into contact with the mounting plate.

7. The fill port assembly of claim 3 and further comprising:

a self-retaining pin extending through the folded hook portion and the flat mounting portion to prevent the mounting plate from being removed from a feed pump system.

8. The fill port assembly of claim 1 and further comprising:

a discharge fitting coupled to the outlet end of the hose and extending into the discharge orifice.

9. A feed pump comprising:

a pump having an inlet and an outlet;

a hopper coupled to the pump inlet;

a manifold comprising:
   an inlet to receive fluid from the pump outlet; and
   a controlled flow outlet;

a feed hose comprising:
   an inlet end coupled to the manifold controlled flow outlet; and
   an outlet end;

a mounting plate including a discharge orifice extending through the mounting plate for connection to the outlet end of the feed hose; and a coupling plate for joining the mounting plate to the feed pump comprising:
   a folded hook portion that attaches to the feed pump;
   a flat mounting portion that attaches to the mounting plate; and
   a discharge hole extending through the flat mounting portion of the coupling plate for alignment with the discharge orifice of the mounting plate; and a quick-connect adapter for joining accessories to the mounting plate adjacent the discharge orifice.

10. The feed pump of claim 9 wherein the quick-connect adapter comprises:

a pair of mounting lugs extending from the mounting plate.

11. The feed pump of claim 10 wherein the folded hook portion for suspending the mounting plate from the feed pump; and the discharge hole extending through the flat mounting portion to receive the outlet end of the feed hose.

12. The feed pump of claim 11 wherein the mounting plate comprises:

a rectilinear body with the discharge orifice extending therethrough; and a pair of threaded lug bores extending through the rectilinear body to receive the pair of mounting lugs, the pair of mounting lugs being threaded to engage the threaded lug bores.

13. The feed pump of claim 11 and further comprising:

a pair of lug bores extending through the mounting plate; and a pair of lug holes extending through the flat mounting portion of the coupling plate;

wherein the pair of mounting lugs are inserted into the pair of lug holes and the pair of lug bores.

14. The feed pump of claim 13 and further comprising:

a slot and hook bulkhead for coupling to the pair of mounting lugs, the slot and hook bulkhead including an opening for receiving an accessory; and a pair of nuts engaging the pair of mounting lugs to bring the slot and hook bulkhead into contact with the mounting plate.

15. The feed pump of claim 11 and further comprising:

a self-retaining pin extending through the folded hook portion and the flat mounting portion to prevent the mounting plate from being removed from the feed pump.

16. The feed pump of claim 9 and further comprising:

a discharge fitting coupled to the outlet end of the feed hose and extending into the discharge orifice.

17. The feed pump of claim 9 wherein the manifold further comprises:

a continuous flow outlet.

18. The feed pump of claim 17 and further comprising:

a recirculation hose comprising:
   an inlet end coupled to the quick-connect adapter; and
   a discharge end disposed within the hopper.

* * * * *